E. G. TEMPLETON.
TIRE MAKING MACHINE.
APPLICATION FILED NOV. 27, 1918.

1,338,407.

Patented Apr. 27, 1920.
8 SHEETS—SHEET 1.

Inventor
Edwin G Templeton,

By Rogers, Kennedy & Campbell
Attorneys

E. G. TEMPLETON.
TIRE MAKING MACHINE.
APPLICATION FILED NOV. 27, 1918.

1,338,407.

Patented Apr. 27, 1920.
8 SHEETS—SHEET 2.

Inventor
Edwin G. Templeton.

By Rogers, Kennedy & Campbell
his Attorneys.

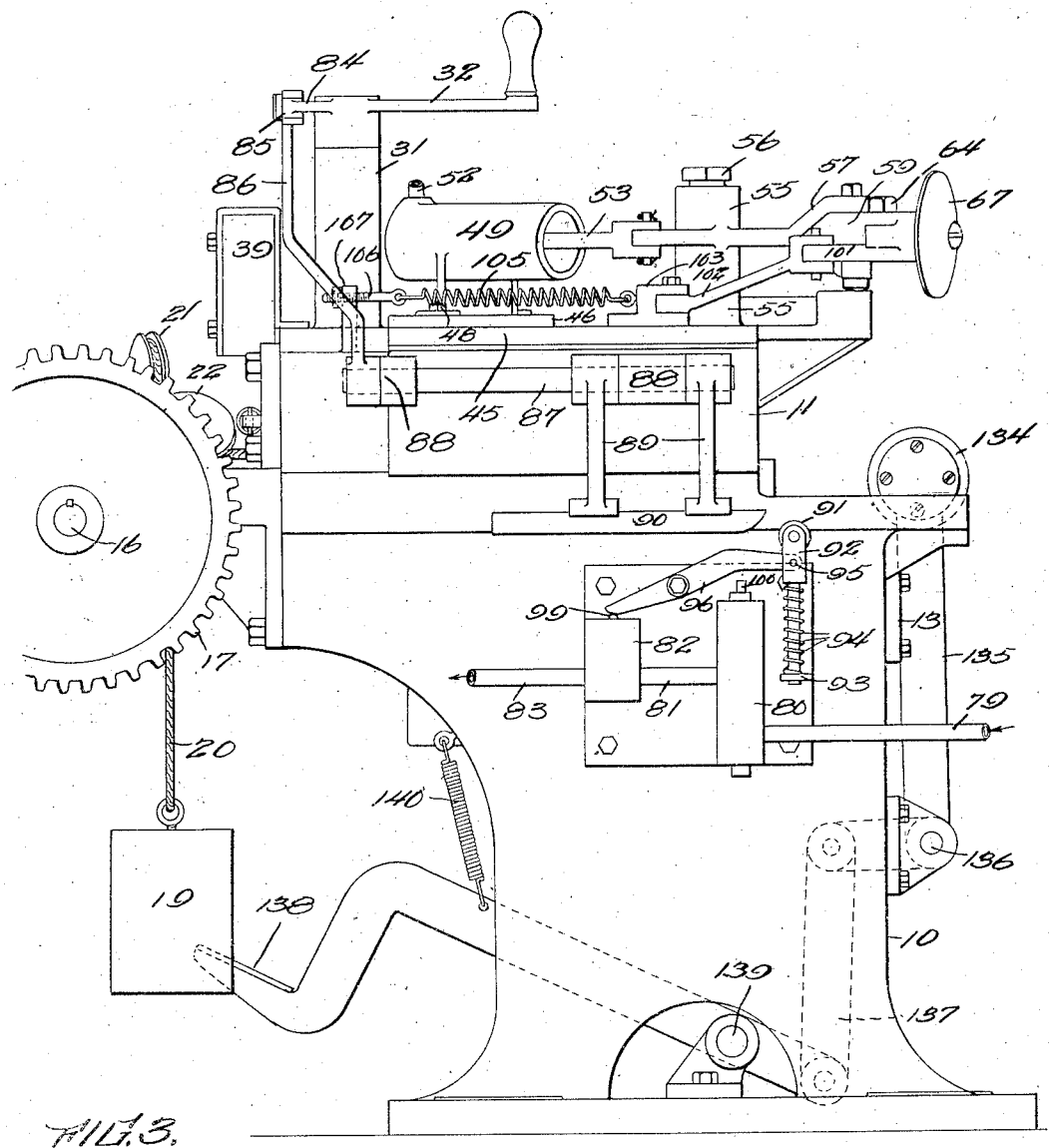

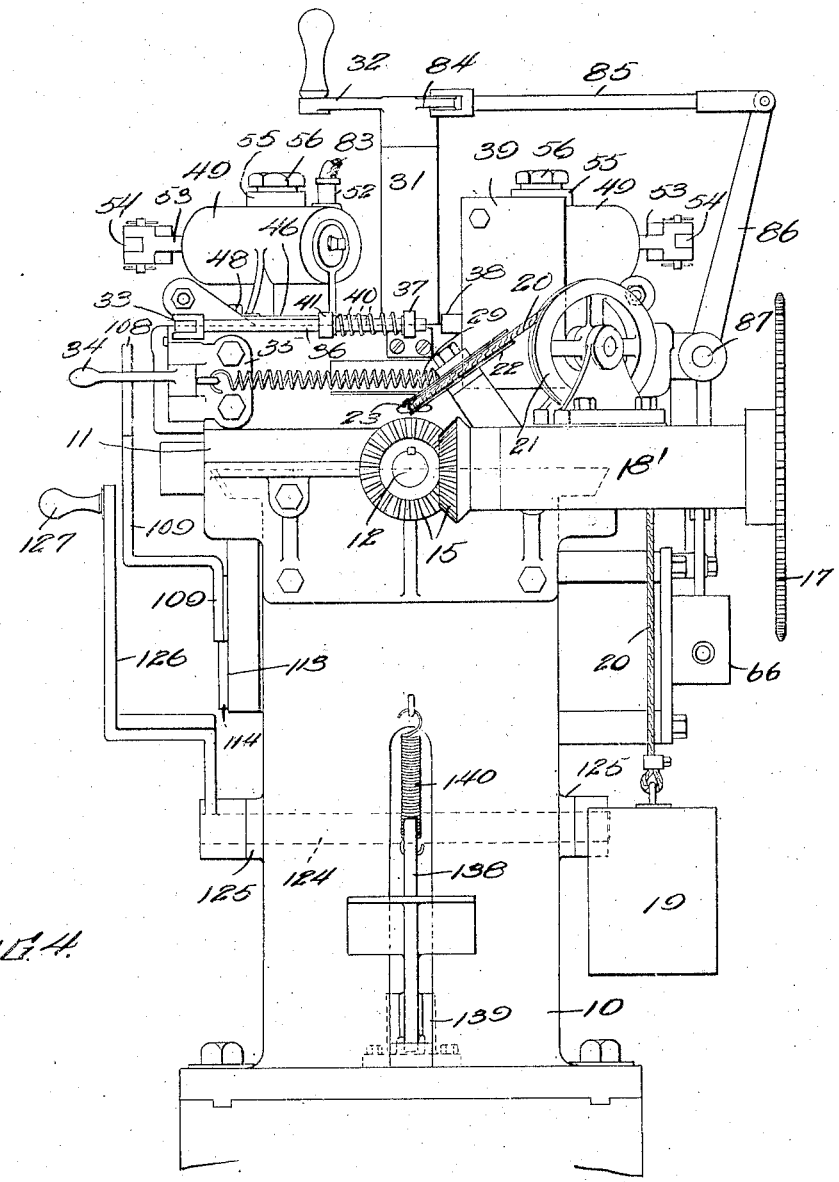

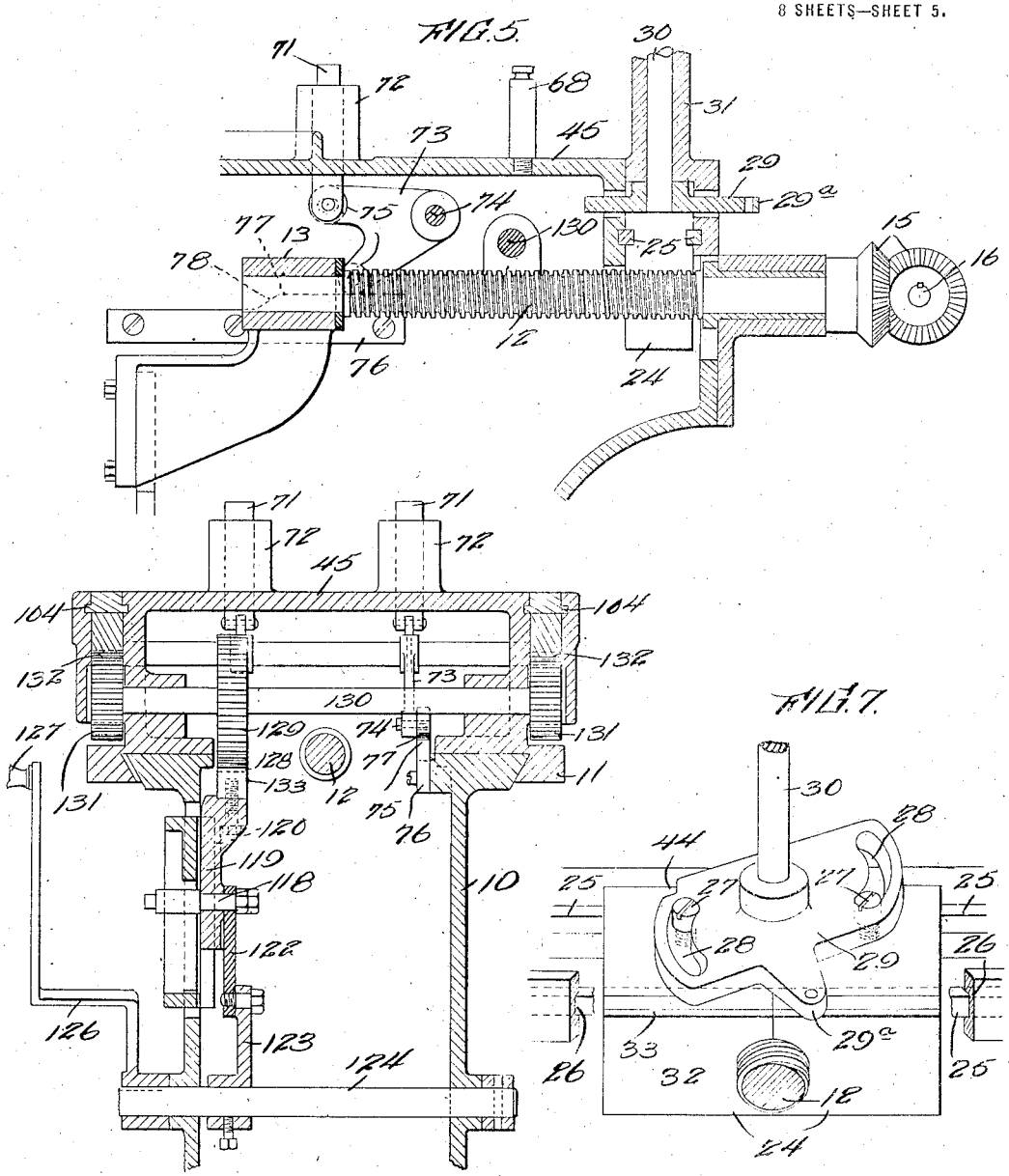

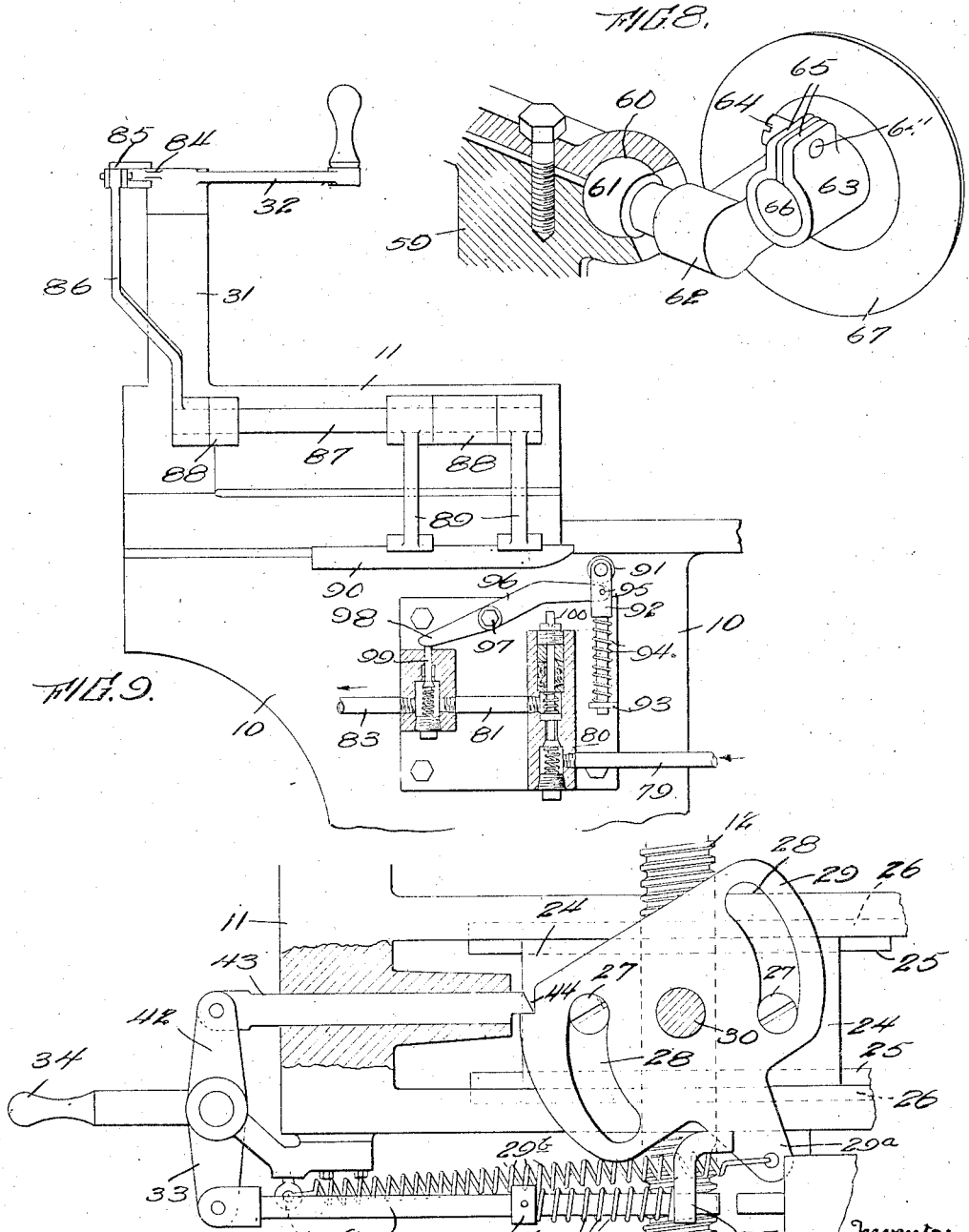

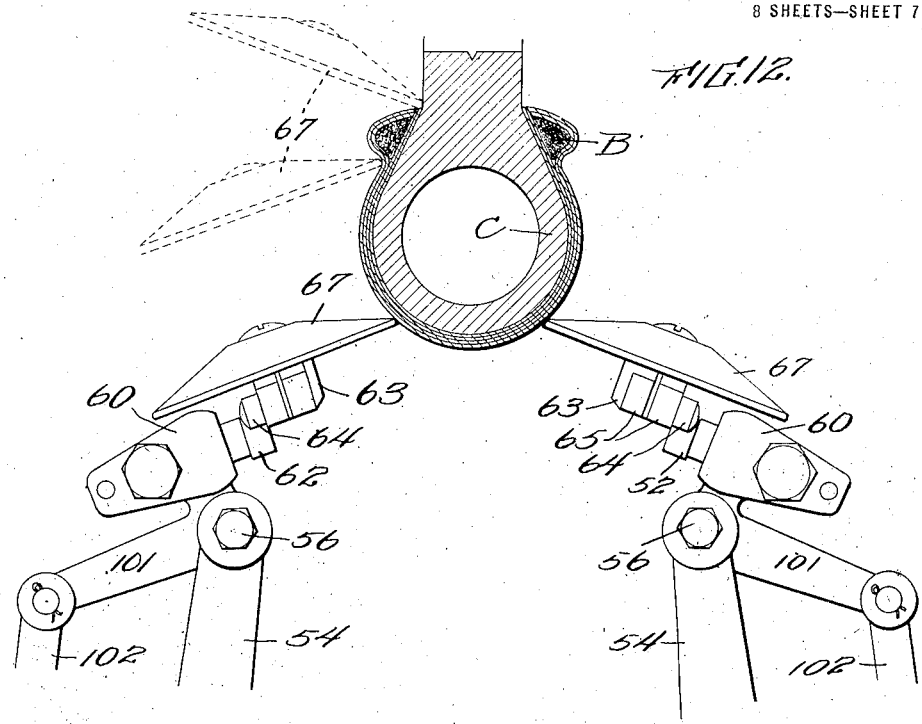
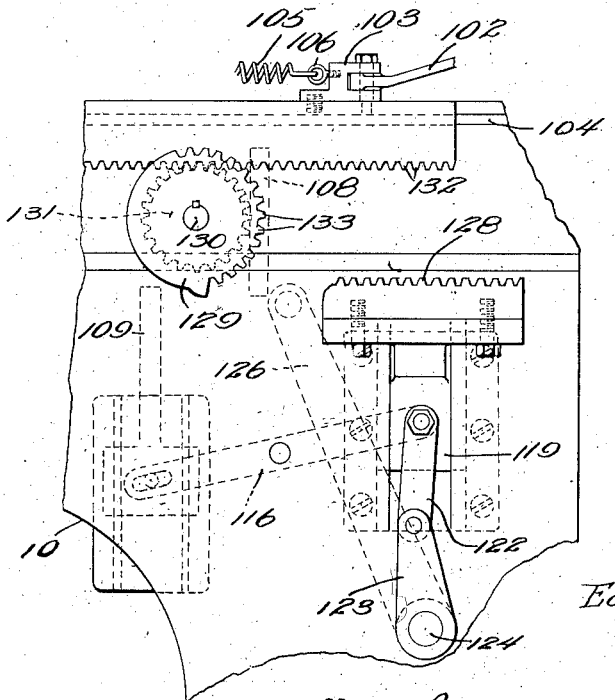

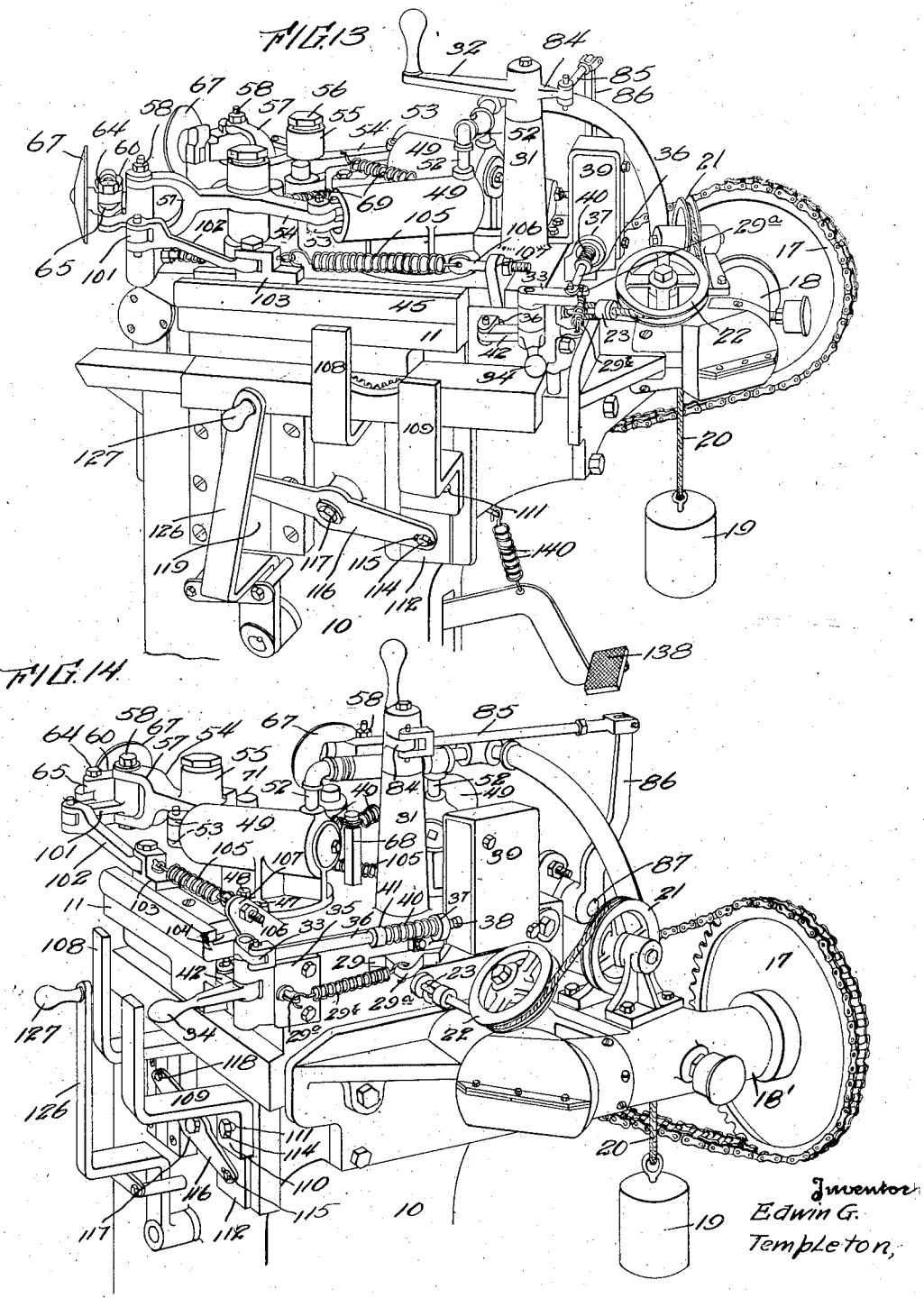

UNITED STATES PATENT OFFICE.

EDWIN G. TEMPLETON, OF AKRON, OHIO, ASSIGNOR TO THE GOODYEAR TIRE & RUBBER COMPANY, OF AKRON, OHIO, A CORPORATION OF OHIO.

TIRE-MAKING MACHINE.

1,338,407.       Specification of Letters Patent.     Patented Apr. 27, 1920.

Application filed November 27, 1918. Serial No. 264,417.

*To all whom it may concern:*

Be it known that I, EDWIN G. TEMPLETON, a citizen of the United States, residing at Akron, in the county of Summit and State of Ohio, have invented certain new and useful Improvements in Tire-Making Machines, of which the following is a specification, reference being had therein to the accompanying drawing.

This invention relates to tire-making machines, and has especial reference to structures for building (so-called) tire carcasses.

The object of the invention is, primarily, to produce an efficient machine wherein the operations are, in a large measure, automatic so that the operator is required to give to the machine, during its operation, only a minimum amount of attention, with the result that the production of tire-carcasses, in a day's time, is greatly increased.

Another object within the contemplation of my invention is to provide for electropneumatically controlling certain of the operations of the machine, whereby manipulation of its parts manually is largely obviated.

Still another object of the invention is to provide, in a machine of this character, automatically-actuated mechanism adapted for the so-called "over-bead operation" as well as for the "under-bead operation;" the mechanism therefor depending for its operation principally upon automatically-actuated instrumentalities in the machine, whereby a uniformity of product is insured, and, likewise, an increased production with a minimum of labor.

A still further object of the invention is to provide a machine in which the stitcher-supporting carriage is automatically given its advancing movement toward a tire-forming core while its stitcher-devices are being automatically operated and angularly guided to conform to the ever-changing contour of the core; there being mechanism automatically to arrest such movement of the carriage at a predetermined point, whereupon the carriage is automatically returned to starting position and, thus, made ready for a second advancing movement.

A more specific object of the invention is to provide stitcher-devices which act in part under the control of pressure-fluid and, while being thus actuated, are also further and automatically operated by instrumentalities set into operation during the advancing travel of the carriage, so that the required relative angularity of the stitcher-devices—and particularly for their over-bead operation—is, with uniformity and certainty, accomplished in timed relation with respect to the traversing movement of the stitcher-devices along the surfaces of the fabric-covered core.

Still another specific object of the invention is to provide conveniently-operated means for manually as well as for automatically connecting the carriage to, and disconnecting the same from, its driving-mechanism.

With these and other objects in view, the invention resides in the novel mechanisms and aggroupment of structures, all as hereinafter fully explained and claimed.

In order that the invention may be more readily comprehended, a practical embodiment thereof is, by way of disclosure, shown in the accompanying drawings; but these drawings, it is to be understood, are merely illustrative, since it will be evident that the invention is susceptible of a wide range of variation and modification without departing from the spirit of the invention or sacrificing any of its salient and underlying features and principles.

In these drawings:

Fig. 3 is a view also in side elevation, taken from the opposite side of the machine;

Fig. 4 is a view in front elevation of the machine;

Fig. 5 is a fragmentary view in central vertical, longitudinal section taken on the line 5—5, Fig. 1;

Fig. 6 is also a fragmentary view in vertical transverse section of the machine, taken on the line 6—6, Fig. 2;

Fig. 7 is a fragmentary view, in perspective and on a larger scale, of mechanism for connecting the stitcher-carriage to, and disconnecting it from, its operating screw;

Fig. 8 is also a fragmentary view, in perspective and partly in section, of a ball-and-socket mounting for the stitcher-disk;

Fig. 9 is a fragmentary view in sectional elevation, showing mechanism for operating valves to admit a fluid under pressure to and to exhaust it from cylinders forming components of the stitcher-devices;

Fig. 10 is a view in horizontal section of a portion of the machine, showing (in part) the carriage-arresting mechanism;

Fig. 11 is a view in vertical longitudinal section of a portion of the machine, showing (in part) the angularity-varying mechanism;

Fig. 12 is a diagrammatic view illustrating the position of the parts at different stages of the angularity-varying operations; and Figs. 13 and 14 are views in perspective of the machine from different viewpoints.

Figure 1:
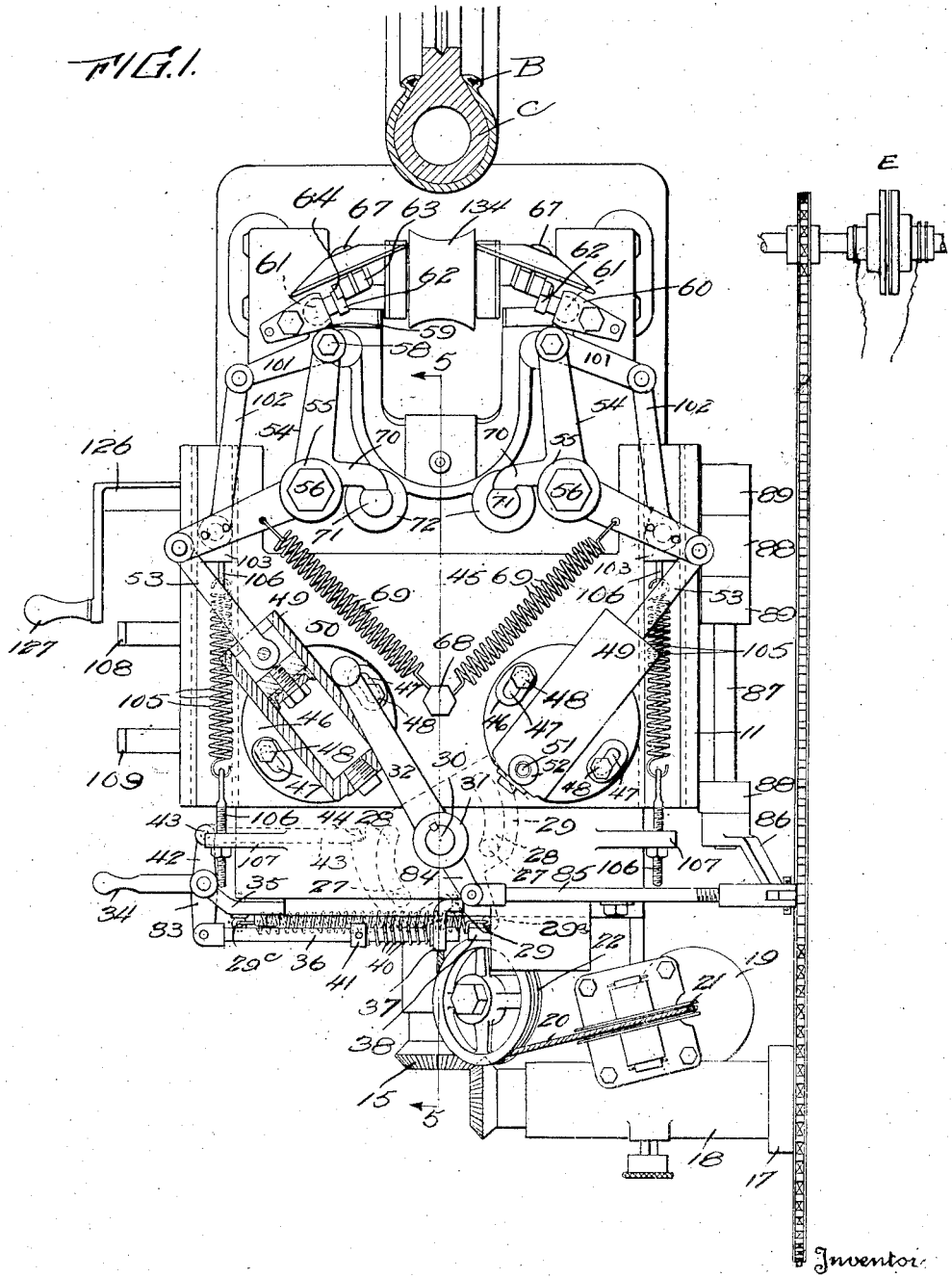
Figure 1 is a view in top plan of a tire-making machine made in accordance with my invention, some of the parts being shown in section in order that their internal construction may be seen, and a tire-forming core being illustrated in operative relation thereto.

Referring to these drawings, the reference-numeral 10 designates a base or pedestal, which may be of any desired or required construction and dimensions; it being shown (in this instance) as designed to support, in general, a stitcher-carriage 11 adapted to support stitching-mechanism and to be advanced toward and retracted from a juxtaposed tire-forming core C.

*Carriage-actuating mechanism.*—Preferably and as shown, the carriage 11 is mounted for a reciprocatory movement on the base in respect to the core. Any appropriate means for effecting such movement of the carriage may be employed; but, in this instance, I have disclosed the machine as including a carriage-advancing feed-screw 12 which is journaled in bearings 13 and 14 (Fig. 5) on the frame 10. The screw may be driven in any appropriate manner; but, for this purpose, I have herein illustrated it as being operated by a pair of associated bevel-gears 15 carried, respectively, by the feed-screw 12 and by a transverse shaft 16, the latter carrying a sprocket-wheel 17 and mounted in a bearing 18 on the machine-frame 10. The sprocket-wheel is designed to be driven by any appropriate means, as by an electric motor (not shown).

The feed-screw with its power-drive constitutes an automatic means for effecting an advancing movement of the carriage toward the core C when the carriage is connected to the screw, in a manner presently to be explained. In practice, it is desirable also to provide automatic means for effecting a receding movement of the carriage away from the core; and in this instance, I have shown a motor for accomplishing this result, the motor, in this instance, being in the form of a weight 19 which is connected by a cord or cable 20 to the carriage, the cord passing over sheaves 21 and 22 mounted on the machine-frame and connected to a ring 23 on the rear end of the carriage.

*Carriage connecting and disconnecting mechanism.*—In this instance, means are provided both for manually connecting the carriage to the feed-screw and for automatically disconnecting it therefrom: Such means include a split-nut device comprising two members 24 (Figs. 5 and 7) provided with guide-elements 25 slidably fitted in guideways 26 mounted on the machine-frame 10. The nut-members 24 carry pins or screws 27 adapted to work in arcuate cam-slots 28 formed adjacent the opposite ends of an operating-plate 29. This operating-plate is provided with a lug 29$^a$ to which is connected one end of a plate-swinging spring 29$^b$, the other end of the spring being connected to a lug 29$^c$ on the side of the carriage. Upstanding from the plate 29 is a shaft 30 mounted to turn in an upright bearing 31. Secured to the upper end of the shaft 30 is an operating or carriage-controlling lever 32: When this lever 32 is swung to the left (as in Fig. 1), the slotted plate 29 effects a relative movement of the nut-members 24 into a gripping engagement with the feed-screw, whereupon—the screw then being in rotation—the carriage is advanced toward the core C. The swinging of the plate 29 in the manner just described tensions the spring 29$^b$, which will then have a tendency to return the plate to its original position.

Figure 2:
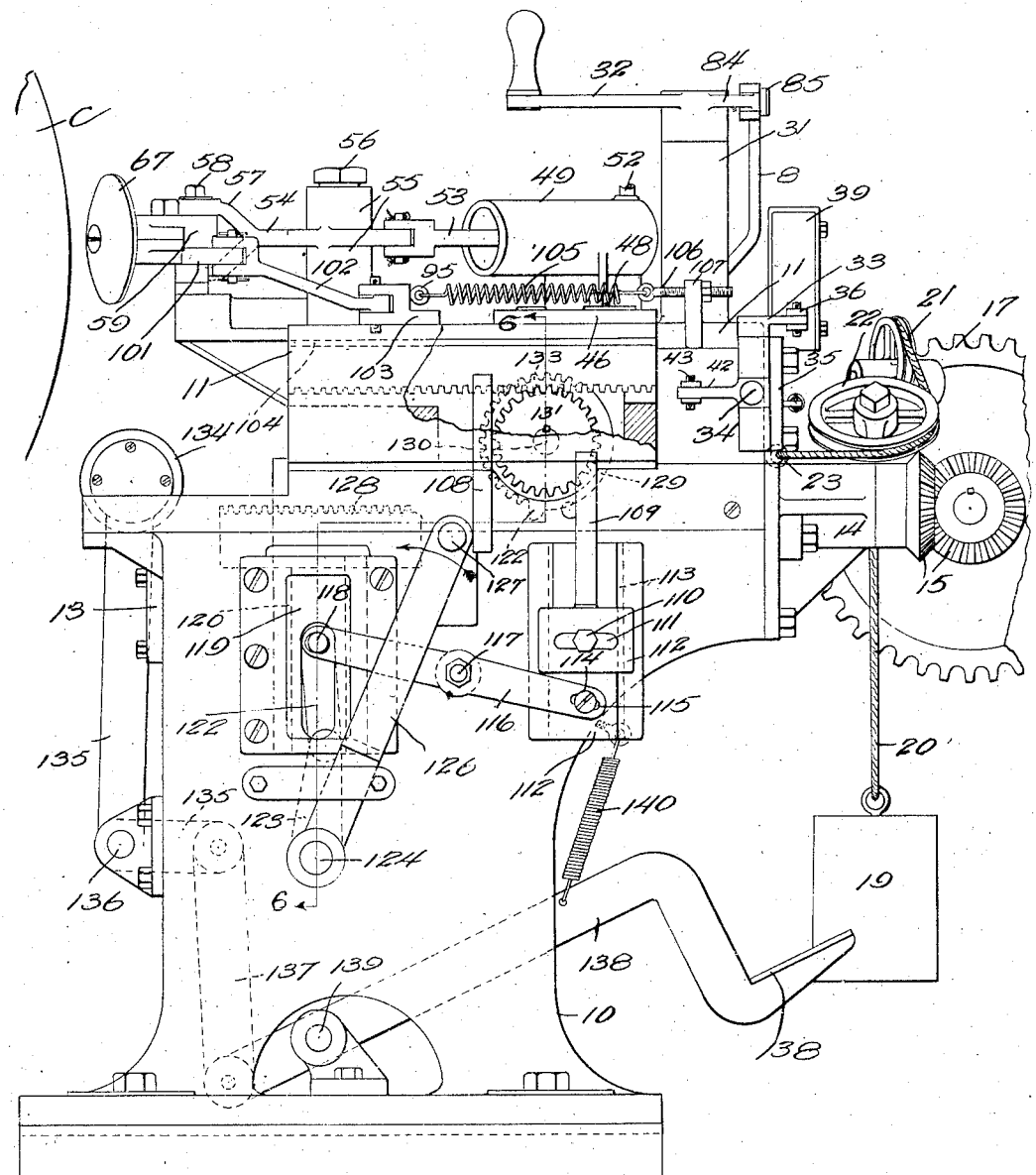
Fig. 2 is a fragmentary view in side elevation of the machine, a portion of it being broken away to reveal certain internal structure.

Means are preferably provided for electrically controlling the rotation of the feed screw; and, to this end, I provide an electromagnetic clutch E which is disposed as an adjunct to the aforementioned electric-motor for driving the sprocket wheel. To operate the clutch, I provide an angular control-lever 33 having an outstanding handle 34 at the left side of the machine as viewed in Figs. 1 and 4. This lever is pivotally mounted on a bracket 35 on the carriage 11; and to it is pivotally connected one end of a slide-bar 36 supported in a guide 37 on the machine-frame. The end of this bar is adapted to engage a push-button 38 of an electric switch (not shown) in a switch-box 39 mounted on the top of the machine-frame and in electrical circuit with the clutch E. The bar 36 is normally held out of contact with the button 38 by a spring 40 which encircles the bar and bears at one end against the guide 37 and at the other against a collar 41 adjustably secured to the bar. It is to be understood that when the bar is out of engagement with the switch-button, as seen in Figs. 1 and 2, the switch itself is closed so that the electro-magnetic clutch will have put the electric motor into operation and this effects rotation of the sprocket-wheel 17 and, thus, of the feed-screw 12. By means of the control-lever 33, therefore, the clutch and, thus, the motor may be started and stopped, as required.

In order to operate the electric switch to stop the motor, for instance, at any predetermined point in the travel of the carriage, the angular lever 33 is provided with an arm 42, to one end of which is pivotally connected a bar or latch 43 (Figs. 1 and 10) adapted to have its free end engage with a notched portion 44 of the slotted plate 29 to hold the latter in the shifted position shown in Fig. 1 and against a returning action by the spring 29$^b$: In other words, when the carriage controlling-lever 32 is swung counter-clockwise, that is, toward the left (as in Fig. 1) to start the machine, the plate 29 will be caused to occupy the position shown, with its notched portion in engagement with the latch 43; and, by the same movement, this plate will have tensioned the spring 29$^b$ and also have effected an engagement of the nut-members 24 with the feed-screw to produce an advancing movement of the carriage toward the core. When, however, the operating-lever 32 is swung in clockwise direction and, thus, moved toward the right (as viewed in Fig. 1) the plate 29 will likewise be swung in a clockwise direction, and this will cause it to actuate and then disengage from the bar 43, the latter then operating (through the lever 33) to shift the bar 36 so that its end will engage with and push the switch-button 38 and thereby operate the electro-magnetic clutch to stop the electric motor. At the same time, of course, the plate 29 will have disengaged the nut-members 24 from the feed-screw. Then, both the motor and the screw will have been brought to rest.

The carriage being, thus, disconnected from its drive, the weight-motor 19 immediately becomes active and returns the carriage to starting position. Thus, a cycle of travel of the carriage in respect to the core will have been effected; this involving, first, an advancing movement of the carriage toward the core, then the arrest of the carriage at a predetermined point in respect to the core, and then the return of the carriage to starting position.

*Stitcher mechanism.*—The carriage is designed to support and effect a positioning of two oppositely-disposed stitcher-devices constituting a stitcher-mechanism which is adapted to operate upon the core while the carriage is making its advancing movement; and this stitcher-mechanism includes the following structure:

Disposed on the top-plate 45 of the carriage are two oppositely-disposed table-bases 46, each provided with slots 47 through which extend shoulder-screws 48 for securing the bases in any of a plurality of adjustable positions. Upstanding from each of these bases is a cylinder 49 in which a piston 50 is actuated by pressure-fluid introduced into the cylinder through a port 51 which communicates with a pipe 52 terminating in a T-member and which connects with a feed-pipe (not shown), that, in turn, connects with a suitable source of supply.

A link 53 is pivotally connected to the piston and to this link is jointed a bell-crank lever 54 provided with upwardly and downwardly extending bosses 55 mounted on vertical pivots 56 which upstand from the top-plate 45 of the carriage. One member of the bell-crank lever is, as at 57, of yoke-form, and between its bifurcations extends a pivot 58 for a short stitcher-supporting arm 59. This arm is provided with a socket 60 (Fig. 8) in which a ball 61 is fitted, and which supports an angular arm 62 provided with a split sleeve 63 adapted to be constricted, as by a screw 64 threaded into lugs 65 formed on the sleeve. Secured in the sleeve is a stub-shaft 66 on which a stitcher-disk 67 is rotatably mounted. Attached to each bell-crank 54 and to a post 68 upstanding from the top-plate of the carriage is a retracting spring 69 having a normal tendency to swing the left bell crank in a counterclockwise direction and against the action of the pressure-fluid in the cylinders 49 when such fluid is active therein. To control the rotative movement of each bell-crank lever in one direction, it is provided with a projection 70 adapted at times to engage a movable stop 71 slidably supported in a boss 72 upstanding from the top-plate 45 of the carriage. The stop 71 extends below the bottom of the top-plate and is there pivotally connected to a bell-crank lever 73 (Fig. 5) operating on a pivot 74 and carrying a roller 75 at its free end. Adapted to coöperate with the roller-carrying bell crank 73 is a stationary cam-plate 76 secured to the machine-frame and provided with a horizontal roller-engaging surface 77 and with a beveled roller-engaging surface 78.

It is to be understood that as the carriage moves toward the core in its advancing movement, the roller 75 on the bell-crank 73 traverses the horizontal surface 77, during which movement the stop 71 remains in its upwardly extended position; but, when the roller reaches and traverses the beveled surface 78, the stop 71 is gradually retracted and this effects a disengagement of its upper end from the projection 70 on the bell-crank 54. This structure normally maintains the two stitcher-disks in proper spaced relation in respect to the core just prior to the commencement of the stitcher operation; but, as the stitcher-devices engage the core and begin their travel around the curved contour thereof, it is necessary to permit them to change their relation to accord with the curvature and contour of the core, and this is effected by the withdrawal of the stops 71 in the automatic manner just explained.

*Pressure-fluid control.*—As already mentioned, the pistons 50 are adapted to be actuated in the cylinders 49 by a suitable pressure-fluid which, in this instance, is compressed air; and means are provided for manually and automatically controlling the flow of the pressure-fluid into and out of the cylinders: To this end, I provide an air-feed pipe 79 connected with a suitable source of supply of pressure fluid, and extending into an admission-valve 80 supported on the machine-frame 10 beneath the carriage 11. From the admission-valve a short connecting pipe 81 extends into an exhaust-valve 82, and from this valve extends a pipe 83 in communication with the T-member that connects with the pipe 52 leading into the rear end of each of the cylinders 49.

*Valve-operating mechanism.*—Preferably and as shown, means for manually and automatically operating the valves 80 and 82 are provided; and such means include, first, a connection between the controlling-lever 32 and the admission and exhaust valves, and, secondly, means (acting under the influence of the carriage when moving) to operate the valves at predetermined points in the travel of the carriage. The operating-lever 32 is provided with an extension 84, to the end of which is pivotally connected one end of a link 85. To the opposite end of the link is pivotally connected one end of a downwardly-extending lever 86. This lever is fast on one end of a rock-shaft 87 journaled in bearings 88 on the carriage 11. To this shaft 87 are secured two juxtaposed pendant arms 89, carrying at their lower ends an elongated shoe 90. This shoe is adapted to engage with and ride on a roller 91 journaled between bifurcations formed in the upper end of a roller-carrying member 92 which is supported in a bracket 93 mounted on the machine-frame 10. The member 92 is controlled in one direction by a compression spring 94 which encircles and bears against the lower end of the bracket 93. Pivoted, as at 95, between the bifurcations on the upper end of the member 92 is a valve-operating lever 96 which fulcrums on a pivot 97. Normally, the free end 98 of this lever presses against a spring-pressed stem 99 operating in the exhaust-valve 82 and opens this valve to exhaust the pressure-fluid from the cylinders 49. The lever is also operable to press against a spring-pressed stem 100 operating in the admission-valve 80. It is to be understood that when the operating-lever 32 is in the position illustrated in Fig. 1, the shoe 90 will be disposed in line with but disengaged from the roller 91. At that time, the lever 96 will, as already stated, press against the stem 99 to open the valve 82 for exhausting the pressure-fluid from the cylinder; but, as the carriage travels toward the core, the shoe 90 will ride against and then on the roller 91 and thereby rock the lever 96 on its fulcrum 97, with the result that its free end 98 will be disengaged from the stem 99 to permit it to close the exhaust-valve while another portion of the lever will engage and operate the stem 100. This operation closes the exhaust-valve 82 and simultaneously opens the admission-valve 80, whereupon the pressure-fluid will pass from the admission-valve 80, through the pipe 81 and exhaust-valve 82, into the pipe 83 and, thence, through the pipe 52 into the cylinders 49, whereupon the pistons 50 are thereby moved forwardly and, by their connections with the bell-cranks 54, effect a swinging movement thereof to move the stitcher-disks 67 toward each other so that they will press yieldingly, under the stress of the pressure-fluid in the cylinders, against the side of the core.

For the under-bead operation—that is, the operation which involves the stitching down of a ply, or of two or more plies, onto the forming-core, before the beads have been disposed thereon,—the position of the stitcher-disks 67 is maintained at approximately the same angle in relation to the contour of the core; but, for the over-bead operation—which involves the stitching down of one or more plies of fabric onto the previously-laid plies of fabric and over the beads then properly disposed thereon—it is usually desirable to effect a change in the degree of angularity of the stitchers with respect to each other and in relation to the fabric-covered core: Heretofore, it usually has been the practice manually to effect a change in the angular relation of the stitcher disks with reference to the core; but, in the present instance, I provide automatic means for accomplishing this result: To this end, the stitcher-supporting arms 59 are provided with extensions 101, and to each of these extensions 101 is pivotally connected one end of a link 102. Each of these links 102 is pivotally connected to the forward end of a slide-member 103 arranged to move in a guideway 104 formed in the top-plate 45 of the carriage 11 and adjacent its outer edge. The rear end of each of these slides is connected to a spring 105 which in turn is secured to an eye-bolt 106 adjustably threaded into a lug 107 on the carriage 11. At certain stages of the operation of the machine—as for instance, during the over-bead operation—the structure just described (including the extension 101, the links 102, the slides 103, and the springs 105) become active to effect a swinging of the stitcher-supporting arms on their pivots 58 to change their angle of relation to the core, and this structure operates and at a predetermined point in the advancing travel of the carriage.

*Carriage-arresting mechanism.*—When the carriage has completed its advancing movement it is desirable to arrest it and, for this result, I provide the following structure:

Outstanding from the left side of the machine (as viewed in Figs. 1, 2 and 4) is a fixed stop or member 108 (which is always in engaging position) and an adjustable stop or member 109 similarly disposed at the side of the machine, but movable into and out of engaging position. The stop 109, preferably and as shown, has its lower end connected to a bolt 110 which extends through a slot 111 in a vertical sliding-member 112 disposed for movement in a guide-way 113 formed at the side of the machine-frame. The slot 111 in the slide 112 permits horizontal adjustment of the bolt 110 therein and, thus, of the stop 109. The slide 112 carries a shoulder screw 114 which extends through a slot 115 in a rocking lever 116, fulcrumed at 117 on the side of the machine-frame. The opposite end of the lever 116 carries a pin 118 which connects the lever 116 with a vertically reciprocating slide 119 arranged to move in a guide-way 120 on the machine frame. The pin 118 extends through a slot 121 in the machine-frame, and to this pin is pivotally connected a link 122 (Fig. 6) having its lower end pivotally connected to an arm 123 secured to a transverse shaft 124 journaled in bearings 125 in the machine-frame. Secured to the shaft 124, and outside of the machine-frame, is a shaft-actuating arm or crank 126 provided with a handle 127 at its upper end.

When the machine is to stitch down the initial plies, for the under-bead operation, the stop 109 is the effective stopping instrumentality; and to position it, the crank 126 is swung rearwardly, that is, in the direction indicated by the arrow in Fig. 2. As a result of this movement the slide 119 is lowered, and the slide 112 is raised to lift the stop 109 into the path of travel of the handle 34 of the control-lever 33 so that, when the carriage 11 shall have advanced to the position where the fabric has been laid on the forming-core down to the point at which will be located the inner edge of the bead-core B, (Figs. 1 and 12), the handle 34 will engage the stop 109, whereupon the lever 33 is operated to move the bar 36 against the switch-button 38 and thereby open the electric switch and, thus, stop the motor and arrest operation of the drive of the carriage 11. At the same time that the bar 36 is being moved to operate the switch-button the latch 43 is operated to release the cam-plate 29 so that its spring $29^b$ may swing it in a clockwise-direction and disconnect the split-nut from the feed-screw and, thus, arrest the forward travel of the carriage. By then swinging the operating-lever 32 to the right, Fig. 1, the shoe 90 is moved to effect a closing of the admission-valve 80 and an opening of the exhaust-valve 82 so that the stitching-disks may then be retracted through the action of the spring 69 and, simultaneously therewith, the members 24 of the split-nut are disengaged from the screw 12 so that the carriage is thereby released from the screw and permitted to be returned to starting position by the weight-motor 19.

When the last series of plies of fabric is to be stitched onto the core, for the over-bead operation, the stop 108 is to be the effective stopping instrumentality; hence, the crank 126 is moved forwardly—that is, in a direction opposite to that indicated by the arrow in Fig. 2—and, as a result, the stop 109 is lowered to position it out of the path of the handle 34 so that the latter may travel to and engage the stop 108; and, at the same time, the slide 119 is raised. This slide is provided, on its upper edge, with rack-teeth 128 which are adapted to mesh with a gear 129 mounted on a shaft 130 journaled in the carriage 11. On opposite ends of the shaft 130 are spur-gears 131 adapted to mesh with teeth 132 formed on the under surfaces of the slides 103. It will now be understood that, during the advancing movement of the carriage and when the fabric has to be laid down to the upper edge of the bead-core, teeth 133 (Fig. 2) of the gear 129 will strike the first tooth 128 on the slide 119, and then this gear, its shaft 130, and the spur-gears 131 will be rotated and become operatively connected to the slides 103 so that the latter will be moved forwardly against the action of the springs 105 and thereby operate the links 102 and arms 101 to change the angularity of the stitching-disks 67 as the latter work over the bead-cores to stitch the fabric about the same.

When the fabric has been stitched down over these bead-cores, the carriage will have advanced to a position where the handle 34 will impinge against the stop 108 and, thus, the lever 33 will be actuated to shift the bar 36 and thereby project its end against the electric-switch-button 28 to open the switch and thereby actuate the magnetic-clutch to throw the motor out of operation. The operating-plate 29, having been released by the latch 43, is caused by the spring $29^b$ to be actuated to disengage the split-nut from the feed-screw, and the exhaust-valve 82 is opened. The springs 69 then effect a movement of the bell-cranks 54 on their pivots to swing the stitcher-disks 67 away from the core. About the same time, the springs 105 will retract the slides 103; and the weight-motor 19 operates to return the carriage to starting position.

For each successive operation—as for stitching down a fabric-ply onto the core, and, then superposing additional plies thereonto and onto the core-beads,—these two series of operations are repeated until the carcass is completed.

*Carcass-crowning device.*—Interposed between the machine-frame 10 and the core is a crown-stitcher 134 rotatably mounted on the upper member of a bell-crank lever 135 pivoted at 136 on the machine-frame 10. The second member of the bell-crank 135 is pivotally connected to a link 137 which, in turn, is pivotally connected to a foot-lever 138 which fulcrums at the lower portion 139 of the machine-frame. A retracting-spring 140 is connected to the foot-lever 138 and to the machine-frame, and normally holds the lever in the elevated position shown in Fig. 2. When this lever is depressed, by the operator's foot, the bell-crank lever 135 is rocked on its fulcrum 136, and this positions the crown-stitcher 134 into engagement with the crown of the fabric-covered core. This stitcher operates on sections of the core intermediate the effective portions in which the stitcher-disks 67 act.

From the foregoing, it will be perceived that I have provided a machine in which the movements of the several mechanisms are largely effected and controlled automatically but in a very simple and effectual manner. With a machine so constructed and operated, a uniform operation of the parts is rendered possible, and a high grade product is thus insured.

What I claim is:

1. A tire-building machine including, in combination, a support, a carriage having a to-and-fro movement thereon, automatic means for effecting advancing and receding movements of the carriage, stitcher-devices carried by the carriage, automatic means for actuating the stitcher-devices in one direction, automatic means for returning the stitcher-devices to starting position, and automatic means settable at the will of the operator during the travel of the carriage for actuating the stitcher-devices to vary their angularity.

2. A tire-building machine including, in combination, a support, a carriage having a to-and-fro movement thereon, automatic means for effecting advancing and receding movements of the carriage, automatic means for arresting the carriage at a predetermined point in its advancing movement, stitcher-devices carried by the carriage, automatic means for actuating the stitcher-devices in one direction, automatic means for returning the stitcher-devices to starting position, and automatic means settable at the will of the operator during the travel of the carriage for actuating the stitcher-devices to vary their angularity.

3. A tire-building machine including, in combination, a support, a carriage having a to-and-fro movement thereon, automatic means for effecting advancing and receding movements of the carriage, automatic means for arresting the carriage at a predetermined point in its advancing movement, stitcher-devices carried by the carriage, automatic means for actuating the stitcher-devices in one direction, independent automatic means for returning the stitcher-devices to starting position, and automatic means settable at the will of the operator during the travel of the carriage for actuating the stitcher-devices to vary their angularity.

4. A tire-building machine including, in combination, a support, a carriage having a to-and-fro movement thereon, automatic means for effecting advancing and receding movements of the carriage, electrically-operated mechanism for automatically arresting the carriage at a predetermined point in its advancing movement, stitcher-devices carried by the carriage, automatic means for actuating the stitcher-devices in one direction, automatic means for returning the stitcher-devices to starting position, and automatic means settable at the will of the operator during the travel of the carriage for actuating the stitcher-devices to vary their angularity.

5. A tire-building machine including, in combination, a support, a carriage having a to-and-fro movement thereon, automatic means for effecting advancing and receding movements of the carriage, electrically-operated mechanism for automatically arresting the carriage at a predetermined point in its advancing movement including an electric-switch device, an electro-magnetic clutch in circuit therewith, and means operated during the travel of the carriage for actuating the switch-box and thereby operating the magnetic clutch.

6. A tire-building machine including, in combination, a support, a carriage having a to-and-fro movement thereon, automatic means for effecting advancing and receding movements of the carriage, electrically-operated mechanism for automatically arresting the carriage at a predetermined point in its advancing movement including an electric-switch device, an electro-magnetic clutch in circuit therewith, means operated during the travel of the carriage for actuating the switch-box and thereby operating the magnetic clutch, said operating means comprising a control-lever, a slide-member movable in relation to the switch-device, and a connection between the lever and slide-member.

7. A tire-building machine including, in combination, a support, a carriage having a to-and-fro movement thereon, automatic means for effecting advancing and receding movements of the carriage, electrically-operated mechanism for automatically arresting the carriage at a predetermined point in its advancing movement including an electric-switch device, an electro-magnetic clutch in circuit therewith, means operated during the travel of the carriage for actuating the switch-box and thereby operating the magnetic clutch, said operating means comprising a control-lever on the carriage, a slide-member normally disengaged from the switch-device and movable in relation thereto, and a spring for actuating the slide-member in one direction.

8. A tire-building machine including, in combination, a support, a carriage having a to-and-fro movement thereon, automatic means for effecting advancing and receding movements of the carriage, electrically-operated mechanism for automatically arresting the carriage at a predetermined point in its advancing movement including an electric-switch device, an electro-magnetic clutch in circuit therewith, means operated during the travel of the carriage for actuating the switch-box and thereby operating the magnetic clutch, said operating means comprising a slide-member normally disengaged from the switch-device, a spring for actuating the slide-member in one direction, and an operating lever in operative connection with the slide-member and movable to tension the spring.

9. A tire-building machine including, in combination, a support, a carriage having a to-and-fro movement thereon, automatic means for effecting advancing and receding movements of the carriage, electrically-operated mechanism for automatically arresting the carriage at a predetermined point in its advancing movement including an electric-switch device, an electro-magnetic clutch in circuit therewith, means operated during the travel of the carriage for actuating the switch-box and thereby operating the magnetic clutch, said operating means comprising a slide-member normally disengaged from the switch-device, a spring for actuating the slide-member in one direction, an operating lever in operative connection with the slide-member and movable to tension the spring, a feed-screw forming a component of the carriage-advancing means, a split-nut device engageable with the nut-device, and means actuated by the operating-lever and engageable with the nut device.

10. A tire-building machine including, in combination, a support, a carriage having a to-and-fro movement thereon, automatic means for effecting advancing and receding movements of the carriage, electrically-operated mechanism for automatically arresting the carriage at a predetermined point in its advancing movement including an electric-switch device, an electro-magnetic clutch in circuit therewith, means operated during the travel of the carriage for actuating the switch-box and thereby operating the magnetic clutch, said operating means comprising a slide-member normally disengaged from the switch-device, a spring for actuating the slide-member in one direction, an operating lever in operative connection with the slide-member and movable to tension the spring, a feed-screw forming a component of the carriage-advancing means, a split-nut device engageable with the nut-device, means actuated by the operating lever and engageable with the nut device, and means normally in the path of travel of the control-lever to swing the same and thereby effect a disengagement of said lever-actuated means from the nut-device.

11. A tire-building machine including, in combination, a support, a carriage having a to-and-fro movement thereon, automatic means for effecting advancing and receding movements of the carriage, electrically-operated mechanism for automatically arresting the carriage at a predetermined point in its advancing movement including a switch device, a clutch associated therewith, means operated during the travel of the carriage for actuating the switch-device and thereby operating the clutch, said operating means comprising a slide-member normally disengaged from the switch-device, a spring for actuating the slide-member in one direction, an operating lever in operative connection with the slide-member and movable to tension the spring, a feed-screw forming a component of the carriage-advancing means, a split-nut device engageable with the nut-device, means actuated by the operating lever and engageable with the nut device, means normally in the path of travel of the control-lever to swing the same and thereby effect a disengagement of said lever-actuated means from the nut-device, and means for operating the split-nut device to effect its engagement with the feed-screw.

12. A tire-building machine including, in combination, a support, a carriage having a to-and-fro movement thereon, automatic means for effecting advancing and receding movements of the carriage, mechanism for automatically arresting the carriage at a predetermined point in its advancing movement including an electric-switch device, a clutch associated therewith, means operated during the travel of the carriage for actuating the switch-device and thereby operating the clutch, said operating means comprising a slide-member normally disengaged from the switch-device, a spring for actuating the slide-member in one direction, an operating lever in operative connection with the slide-member and movable to tension the spring, a feed-screw forming a component of the carriage-advancing means, a split-nut device engageable with the nut-device, means actuated by the operating lever and engageable with the nut device, means normally in the path of travel of the control-lever to swing the same and thereby effect a disengagement of said lever-actuated means from the nut-device, and means for operating the split-nut device to effect its engagement with the feed-screw, including an operating-lever on the carriage and operable independently of the control-lever.

13. A tire-building machine including, in combination, a support, a carriage having a to-and-fro movement thereon, automatic means for effecting advancing and receding movements of the carriage, including a feed-screw and means for driving the same, a split-nut device engageable with the screw to connect the carriage thereto comprising a pair of actuatable members, a support therefor on the carriage, a slotted operating member connected to the members and operable to engage or disengage them with the screw, an operating-lever for controlling the operating-member, stitcher-devices carried by the carriage, automatic means for actuating the stitcher-devices in one direction, automatic means for returning the stitcher-devices to starting position, and automatic means settable at the will of the operator during the travel of the carriage for actuating the stitcher-devices to vary their angularity.

14. A tire-building machine including, in combination, a support, a carriage having a to-and-fro movement thereon, automatic means for effecting advancing and receding movements of the carriage, including a feed-screw and means for driving the same, a split-nut device engageable with the screw to connect the carriage thereto comprising a pair of actuatable members, a support therefor on the carriage, a slotted-operating member connected to the members and operable to engage or disengage them with the screw, an operating-lever for controlling the operating-member, one of said nut-members being notched, a control-lever on the carriage, and a shiftable element movable by the control-lever and engageable with the notched portion of the nut-member.

15. A tire-building machine including, in combination, a support, a carriage having a to-and-fro movement thereon, automatic means for effecting advancing and receding movements of the carriage, including a feed-screw, a split-nut engageable therewith, a switch-device, means common to the split-nut and switch-device for operating the same, stitcher-devices carried by the carriage, automatic means for actuating the stitcher-devices in one direction, automatic means for returning the stitcher-devices to starting position, and automatic means for actuating the stitcher-devices to vary their angularity.

16. A tire-building machine including, in combination, a support, a carriage having a to-and-fro movement thereon, automatic means for effecting advancing and receding movements of the carriage, including a feed-screw, a split-nut engageable therewith, a switch-device, means common to the split-nut and switch-device for operating the same, including a control-lever, a slide-member normally disengaged from the switch-box, a connection between the lever and slide member, a nut-engaging element, and a connection between the lever and engaging-member.

17. A tire-building machine including, in combination, a support, a carriage having a to-and-fro movement thereon, automatic means for effecting advancing and receding movements of the carriage, including a feed-screw, a split-nut engageable therewith, a switch-device, means common to the split-nut and switch-device for operating the same, and an operating-device for the split-nut.

18. A tire-building machine including, in combination, a support, a carriage having a to-and-fro movement thereon, automatic means for effecting advancing and receding movements of the carriage, including a feed-screw, a split-nut engageable therewith, a switch-device, means common to the split-nut and switch-device for operating the same, including a control-lever, a slide-member normally disengaged from the switch-box, a connection between the lever and slide member, a nut-engaging element, a connection between the lever and engaging-member, and an operating-lever on the carriage and having a swinging movement to actuate the split-nut to effect its engagement with and disengagement from the feed-screw.

19. A tire-building machine including, in combination, a support, a carriage having a to-and-fro movement thereon, automatic means for effecting advancing and receding movements of the carriage, stitcher-devices carried by the carriage, automatic means for actuating the stitcher-devices in one direction including pressure-fluid operated mechanism, a plurality of valve-devices alternately operable, automatic means for returning the stitcher-devices to starting position, and automatic means for actuating the stitcher-devices to vary their angularity.

20. A tire-building machine including, in combination, a support, a carriage having a to-and-fro movement thereon, automatic means for effecting advancing and receding movements of the carriage, stitcher-devices carried by the carriage, automatic means for actuating the stitcher-devices in one direction, including pressure-fluid operated mechanism, a plurality of valve-devices alternately operated, an operating-lever on the carriage, a valve-operating shoe on the carriage, and a connection between the shoe and lever.

21. A tire-building machine including, in combination, a support, a carriage having a to-and-fro movement thereon, automatic means for effecting advancing and receding movements of the carriage, comprising a feed-screw, means for operating it, a split-nut device engageable with the screw, an operating lever connected to the nut-device for controlling it in relation to the feed-screw, stitcher devices carried by the carriage, automatic means for actuating the stitcher-devices in one direction including pressure-fluid operated mechanism, a plurality of valve-devices therefor, a valve-actuating shoe carried by the carriage, a connection between the shoe and the operating lever, automatic means for returning the stitcher-devices to starting position, and automatic means for actuating the stitcher-devices to vary their angularity.

22. A tire-building machine including, in combination, a support, a carriage having a reciprocatory travel thereon, automatic means for effecting an advancing movement of the carriage, including a feed-screw, driving mechanism therefor, a split-nut device engageable with the screw, manually-operated means for effecting engagement of the nut-device with and its disengagement from the screw, comprising a cam plate operatively associated with the nut-device, a spring associated with the plate and having a normal tendency to actuate the same in one direction, an operating-lever associated with the cam plate, automatic means for effecting disengagement of the nut-device from the screw, and automatic means for effecting the return of the carriage to starting position.

23. A tire-building machine including, in combination, a support, a carriage having a reciprocatory travel thereon, automatic means for effecting an advancing movement of the carriage including a feed-screw, driving mechanism therefor, a split-nut device engageable with the screw, manually-operated means for effecting engagement of the nut-device with and its disengagement from the screw, automatic means for effecting disengagement of the nut-device from the screw, comprising a control-lever and means associated therewith and engageable with the nut-device actuating-member, a switch-device associated with said control-lever, a slide connected to the lever and operable thereby to actuate the switch-device, and an electro-magnetic clutch in circuit with the switch-box and controlled thereby for arresting travel of the carriage.

24. A tire-building machine including, in combination, a support, a carriage having a reciprocatory travel thereon, automatic means for effecting an advancing movement of the carriage, including a feed-screw, driving mechanism therefor, comprising a sprocket-wheel, gearing between the wheel and the feed-screw, a motor for driving the sprocket-wheel and associated with the electro-magnetic clutch, a split-nut device engageable with the screw, manually-operated means for effecting engagement of the nut-device with and its disengagement from the screw, automatic means for effecting disengagement of the nut-device from the screw, comprising a control-lever and means associated therewith and engageable with the nut-device actuating-member, a switch-device associated with said control-lever, a slide connected to the lever and operable thereby to actuate the switch-device, and an electro-magnetic clutch in circuit with the switch-box and controlled thereby for arresting travel of the carriage.

25. A tire-building machine including, in combination, a support, a carriage having a to-and-fro movement thereon, automatic means for effecting advancing and receding movements of the carriage, stitcher-devices carried by the carriage, automatic means for actuating the stitcher-devices in one direction, automatic means for returning the stitcher-devices to starting position, comprising a weight-motor, a flexible connection between the motor and the carriage, supporting and guiding sheaves for the connection and angularly disposed relatively, and automatic means for actuating the stitcher-devices to vary their angularity.

26. A tire-building machine including, a support, a carriage having a reciprocatory traveling movement thereon, stitcher-devices on the carriage, automatic means for actuating the stitcher-devices for their stitching function, and automatic means settable at the will of the operator both before and during the travel of the carriage for varying their relative angularity comprising mechanism operated during the movement of the carriage.

27 A tire-building machine including a support, a carriage having advancing and reciprocatory movements thereon, stitcher-devices on the carriage, pressure-fluid operated means for moving the stitcher devices in one direction, automatic means for returning the stitcher-devices to starting position, automatic means for varying the relative angularity of the stitcher-devices comprising sliding-members on the carriage, an operating connection between each member and stitcher-device, and mechanism operating during the travel of the carriage for actuating the sliding members and, thereby, the stitcher-devices.

28. A tire-building machine including a support, a carriage having advancing and reciprocatory movements thereon, stitcher-devices on the carriage, pressure-fluid operated means for moving the stitcher devices in one direction, automatic means for returning the stitcher-devices to starting position, automatic means for varying the relative angularity of the stitcher-devices comprising sliding-members on the carriage, an operating connection between each member and stitcher-device, mechanism operating during the travel of the carriage for actuating the sliding members and, thereby, the stitcher-devices, and a slide-returning instrumentality connected to each slide and made active by the movement of the carriage.

29. A tire-building machine including a support, a carriage having advancing and reciprocatory movements thereon, stitcher-devices on the carriage, pressure-fluid operated means for moving the stitcher devices in one direction, automatic means for returning the stitcher-devices to starting position, automatic means for varying the relative angularity of the stitcher-devices comprising sliding-members on the carriage, an operating connection between each member and stitcher-device, mechanism operating during the travel of the carriage for actuating the sliding members and, thereby, the stitcher-devices, and including pinions coacting with the slide-members to move the same longitudinally, means for supporting the pinions, a gear for actuating such means, a rack engageable with the gear, and mechanism for positioning the rack in engaging location with respect to the gear.

30. A tire-building machine including a support, a carriage having advancing and reciprocatory movements thereon, stitcher-devices on the carriage, pressure-fluid operated means for moving the stitcher devices in one direction, automatic means for returning the stitcher-devices to starting position, automatic means for varying the relative angularity of the stitcher-devices comprising sliding-members on the carriage, an operating connection between each member and stitcher-device, mechanism operating during the travel of the carriage for actuating the sliding members and, thereby, the stitcher-devices including pinions coacting with the slide-members to move the same longitudinally, means for supporting the pinions, a gear for actuating such means, a rack engageable with the gear, mechanism for positioning the rack in engaging location with respect to the gear comprising a pair of slides, an operating-connection between the slides, and a positioning-lever associated with one of the slides.

31. A tire-building machine including a support, a carriage having advancing and reciprocatory movements thereon, stitcher-devices on the carriage, pressure-fluid operated means for moving the stitcher devices in one direction, automatic means for returning the stitcher-devices to starting position, automatic means for varying the relative angularity of the stitcher-devices comprising sliding-members on the carriage, an operating connection between each member and stitcher-device, mechanism operating during the travel of the carriage for actuating the sliding members and, thereby, the stitcher-devices, and including pinions coacting with the slide-members to move the same longitudinally, means for supporting the pinions, a gear for actuating such means, a rack engageable with the gear, mechanism for positioning the rack in engaging location with respect to the gear comprising a pair of slides, an operating-connection between the slides, a positioning-lever associated with one of the slides, and a stop carried by and movable with the slide.

32. A tire-building machine including a support, a carriage having advancing and reciprocatory movements thereon, stitcher-devices on the carriage, pressure-fluid operated means for moving the stitcher devices in one direction, automatic means for returning the stitcher-devices to starting position, automatic means for varying the relative angularity of the stitcher-devices comprising sliding-members on the carriage, an operating connection between each member and stitcher-device, mechanism operating during the travel of the carriage for actuating the sliding members and, thereby, the stitcher-devices and including pinions coacting with the slide-members to move the same longitudinally, means for supporting the pinions, a gear for actuating such means, a rack engageable with the gear, mechanism for positioning the rack in engaging location with respect to the gear comprising a pair of slides, an operating-connection between the slides, a positioning-lever associated with one of the slides, a stop carried by and movable with the slide, a control-lever engageable with the stop, and carriage-arresting mechanism associated with the control-lever and actuated thereby to stop the carriage at a predetermined point in its travel.

33. A tire-building machine including a core, a carriage reciprocable in relation thereto, stitcher-devices sustained thereby, means for moving the stitcher-devices radially with respect to the core, automatic means for varying the relative angularity of the stitcher-devices comprising slide-members on the carriage and provided with rack-teeth on one of their surfaces, operating-connections between the stitcher-devices and the slide-members, pinions meshing with the rack-teeth on the slide-members, a shaft on which the pinions are mounted, a shaft-operating gear on the shaft, a rack-member normally out of engagement with the gear, and means for operating the rack-member.

34. A tire-building machine including a core, a carriage reciprocable in relation thereto, stitcher-devices sustained thereby, means for moving the stitcher-devices radially with respect to the core, automatic means for varying the relative angularity of the stitcher-devices comprising slide-members on the carriage and provided with rack-teeth on one of their surfaces, operating-connections between the stitcher-devices and the slide-members, pinions meshing with the rack-teeth on the slide-members, a shaft on which the pinions are mounted, a shaft-operating gear on the shaft, a rack-member normally out of engagement with the gear, means for operating the rack-member, a slide-element connected to the rack-member, a support for the slide-member, an operating-crank associated therewith for operating the slide-member, a second slide-element juxtaposed thereto, and a connection between the slide-elements.

35. A tire-building machine including a core, a carriage reciprocable in relation thereto, stitcher-devices sustained thereby, means for moving the stitcher-devices radially with respect to the core, automatic means for varying the relative angularity of the stitcher-devices comprising slide-members on the carriage and provided with rack-teeth on one of their surfaces, operating-connections between the stitcher-devices and the slide-members, pinions meshing with the rack-teeth on the slide-members, a shaft on which the pinions are mounted, a shaft-operating gear on the shaft, a rack-member normally out of engagement with the gear, means for operating the rack-member, a slide-element connected to the rack-member, a support for the slide-member, an operating-crank associated therewith for operating the slide-member, a second slide-element juxtaposed thereto, a connection between the slide-elements and a stop carried by and adjustable with the second slide-element.

36. A tire-building machine including a core, a carriage reciprocable in relation thereto, stitcher-devices sustained thereby, means for moving the stitcher-devices radially with respect to the core, automatic means for varying the relative angularity of the stitcher-devices comprising slide-members on the carriage and provided with rack-teeth on one of their surfaces, operating-connections between the stitcher-devices and the slide-members, pinions meshing with the rack-teeth on the slide-members, a shaft on which the pinions are mounted, a shaft-operating gear on the shaft, a rack-member normally out of engagement with the gear, means for operating the rack-member, a slide-element connected to the rack-member, a support for the slide-member, an operating-crank associated therewith for operating the slide-member, a second slide-element juxtaposed thereto, a connection between the slide-elements, a stop carried by and adjustable with the second slide-element, and a stationary stop disposed adjacent the adjustable stop.

37. A tire-building machine including a core, a carriage reciprocable in relation thereto, stitcher-devices sustained thereby, means for moving the stitcher-devices radially with respect to the core, automatic means for varying the relative angularity of the stitcher-devices comprising slide-members on the carriage and provided with rack-teeth on one of their surfaces, operating-connections between the stitcher-devices and the slide-members, pinions meshing with the rack-teeth on the slide-members, a shaft on which the pinions are mounted, a shaft-operating gear on the shaft, a rack-member normally out of engagement with the gear, means for operating the rack-member, a slide-element connected to the rack-member, a support for the slide-member, an operating-crank associated therewith for operating the slide-member, a second slide-element juxtaposed thereto, a connection between the slide-elements, a stop carried by and adjustable with the second slide-element, a stationary stop disposed adjacent the adjustable stop, and a control-lever on the carriage and thereby made engageable with one or the other of the stops.

38. A tire-building machine including a core, a carriage reciprocable in relation thereto, stitcher-devices sustained thereby, means for moving the stitcher-devices radially with respect to the core, automatic means for varying the relative angularity of the stitcher-devices comprising slide-members on the carriage and provided with rack-teeth on one of their surfaces, operating-connections between the stitcher-devices and the slide-members, pinions meshing with the rack-teeth on the slide-members, a shaft on which the pinions are mounted, a shaft-operating gear on the shaft, a rack-member normally out of engagement with the gear, means for operating the rack-member, a slide-element connected to the rack-member, a support for the slide-member, an operating-crank associated therewith for operating the slide-member, a second slide-element juxtaposed thereto, a connection between the slide-elements, a stop carried by and adjustable with the second slide-element, a stationary stop disposed adjacent the adjustable stop, a control-lever on the carriage and thereby made engageable with one or the other of the stops, and carriage-controlling mechanism operated by the control-lever including an electric switch-device and an electro-magnetic clutch controlled thereby and functioning to arrest travel of the carriage.

39. A tire-building machine including a core, a carriage reciprocable in relation thereto, stitcher-devices sustained thereby, means for moving the stitcher-devices radially with respect to the core, automatic means for varying the relative angularity of the stitcher-devices comprising slide-members on the carriage and provided with rack-teeth on one of their surfaces, operating-connections between the stitcher-devices and the slide-members, pinions meshing with the rack-teeth on the slide-members, a shaft on which the pinions are mounted, a shaft-operating gear on the shaft, a rack-member normally out of engagement with the gear, means for operating the rack-member, a slide-element connected to the rack-member, a support for the slide-member, an operating-crank associated therewith for operating the slide-member, a second slide-element juxtaposed thereto, a connection between the slide-elements, a stop carried by and adjustable with the second slide-element, a stationary stop disposed adjacent the adjustable stop, a control-lever on the carriage and thereby made engageable with one or the other of the stops, carriage-controlling mechanism operated by the control-lever including an electric switch-device and an electro-magnetic clutch controlled thereby and functioning to arrest travel of the carriage, and a carriage-advancing mechanism connectible to and disconnectible from the carriage by the movement of the control-lever.

40. A tire-building machine including a stitcher-carriage, and stitcher-devices thereon including bell-crank levers fulcrumed on the carriage, pressure-fluid operated means for swinging each of the levers on its fulcrum, a stitcher-supporting arm attached to the bell-crank lever, a stitcher disk rotatably supported on the arm, and a ball-and-socket connection between the supporting-arm and the bell-crank lever.

41. A tire-building machine including a stitcher-carriage, and stitcher-devices thereon including bell-crank levers fulcrumed on the carriage, pressure-fluid operated means for swinging each of the levers on its fulcrum, and stop-pins associated with the carriage engageable with the bell-crank-levers, and means for disengaging the pins therefrom.

42. A tire-building machine including a stitcher-carriage, and stitcher-devices thereon including bell-crank levers fulcrumed on the carriage, pressure-fluid operated means for swinging each of the levers on its fulcrum, and stop-pins associated with the carriage engageable with the bell-crank-levers, and automatic means for disengaging the pins therefrom.

43. A tire-building machine including a stitcher-carriage, and stitcher-devices thereon including bell-crank levers fulcrumed on the carriage, pressure-fluid operated means for swinging each of the levers on its fulcrum, stop-pins associated with the carriage engageable with the bell-crank-levers, and automatic means for disengaging the pins therefrom including a roller-carrying bell-crank connected to each pin, and means for operating the bell-crank lever.

44. A tire-building machine including a stitcher-carriage, and stitcher-devices thereon including bell-crank levers fulcrumed on the carriage, pressure-fluid operated means for swinging each of the levers on its fulcrum, stop-pins associated with the carriage engageable with the bell-crank-levers, and automatic means for disengaging the pins therefrom including a roller-carrying bell-crank connected to each pin, and means for operating the bell-crank lever comprising a cam-plate and a carriage for supporting the stitcher-devices and for effecting an engagement of the bell-crank with the cam-plate.

45. In combination, a tire-forming core, a support juxtaposed thereto, a carriage having a to-and-fro travel in respect to the core, stitcher-devices on the carriage, a crown-stitcher on the support and operative on the core intermediate the portions thereof engaged by the stitcher-devices on the carriage and means for positioning said crown-stitcher in respect to the core, including a bell-crank lever and an associated foot lever actuatable at the will of the operator.

46. In combination, a tire-forming core, a support juxtaposed thereto, a carriage having a to-and-fro travel in respect to the core, stitcher-devices on the carriage, a crown-stitcher on the support and operative on the core intermediate the portions thereof engaged by the stitcher-devices on the carriage, and means for swinging the crown-stitcher toward the core, including a foot-lever actuatable at the will of the operator and a bell-crank lever interposed between the foot-lever and the crown-stitcher.

47. In combination, a tire-forming core, a support juxtaposed thereto, a carriage having a to-and-fro travel in respect to the core, stitcher-devices on the carriage, a crown-stitcher on the support and operative on the core intermediate the portions thereof engaged by the stitcher-devices on the carriage, means for swinging the crown-stitcher toward the core, including a foot-lever actuatable at the will of the operator and a bell-crank lever interposed between the foot-lever and the crown-stitcher, and automatic means for returning it to an inoperative position.

In testimony whereof I have affixed my signature in presence of two witnesses.

EDWIN G. TEMPLETON.

Witnesses:
  R. S. TROGREN,
  B. J. McDANEL.